United States Patent [19]

Ivers et al.

[11] Patent Number: 5,730,429
[45] Date of Patent: Mar. 24, 1998

[54] DECOUPLERS FOR ACTIVE DEVICES

[75] Inventors: Douglas E. Ivers, Cary; Lane R. Miller, Fuquay-Varina; Lynn C. Yanyo, Cary; Charles M. Nobles, Jr., Wilmington, all of N.C.

[73] Assignee: Lord Corporation, Cary, N.C.

[21] Appl. No.: 145,430

[22] Filed: Oct. 29, 1993

[51] Int. Cl.⁶ ..................................................... F16F 7/10
[52] U.S. Cl. .................................................. 267/140.14
[58] Field of Search ........................ 267/140.13, 140.14, 267/140.15, 219; 248/562, 550; 180/312, 360

[56] References Cited

U.S. PATENT DOCUMENTS

| | | | |
|---|---|---|---|
| 2,919,883 | 1/1960 | Murphy | 248/358 |
| 4,624,435 | 11/1986 | Freudenberg | 248/550 |
| 4,638,983 | 1/1987 | Idigkeit et al. | 267/140.14 |
| 4,650,170 | 3/1987 | Fukushima | 267/140.14 |
| 4,693,455 | 9/1987 | Andra | 267/140.1 |
| 4,793,599 | 12/1988 | Ishioka | 267/140.14 |
| 4,811,919 | 3/1989 | Jones | 244/54 |
| 4,869,474 | 9/1989 | Best et al. | 267/140.14 |
| 4,937,489 | 6/1990 | Hattori et al. | 310/328 |
| 4,957,279 | 9/1990 | Thorn | 267/140.5 |
| 4,964,516 | 10/1990 | Thorn | 267/140.1 |
| 4,978,881 | 12/1990 | Wakita et al. | 310/328 |
| 5,011,108 | 4/1991 | Chen et al. | 248/550 |
| 5,052,529 | 10/1991 | Sutcliffe et al. | 188/378 |
| 5,116,030 | 5/1992 | Nowak | 267/140.4 |
| 5,127,607 | 7/1992 | McGuire | 244/140.4 |
| 5,154,403 | 10/1992 | Sato | 267/141.2 |
| 5,174,552 | 12/1992 | Hodgson et al. | 267/140.11 |
| 5,197,692 | 3/1993 | Jones et al. | 244/54 |
| 5,219,037 | 6/1993 | Smith et al. | 180/312 |

FOREIGN PATENT DOCUMENTS

| | | | |
|---|---|---|---|
| 0440536 | 8/1991 | European Pat. Off. | 267/140.14 |
| 4312229 | 11/1992 | Japan | 267/140.14 |

OTHER PUBLICATIONS

SAE Paper No. 930201, *Active Engine Mount with Piezo-Actuator for Vibration Control*, Ushijima et al, Bridgestone Corp., Mar. 1, 1993.

*Primary Examiner*—Matthew C. Graham
*Attorney, Agent, or Firm*—Randall S. Wayland; James W. Wright

[57] ABSTRACT

A system (20) which includes a frequency-dependent decoupler (21) arranged in a series-spring relationship with an actuator (26) for supplying active forces to cancel vibration. The system (20) also includes a spring (28) for providing a primary load path. The system (20) is responsive to at least one sensor (32, 34, 36 or 38) and is controlled via controller (30). The decoupler (26) has greater frequency dependency than the spring (28) and allows the actuator (26) to be effectively decoupled at low frequency, yet coupled at high frequency. This frequency dependent coupling allows the system (20) to accommodate transient static and low frequency loads and motions by allowing motion across the decoupler (21). However, at high frequency, the decoupler (21) becomes stiffer and couples the actuator (26) with the moving members (22) and (24) such that motion across the decoupler (26) is minimized and the actuator (26) becomes more effective at high frequency attenuation. Alternate embodiments of the decoupler (21) include elastomer decouplers (21b), friction decouplers (21c), glass-transition decouplers (21d), and fluid decouplers (21e),(21f),(21g), and (21h).

13 Claims, 6 Drawing Sheets

DECOUPLERS FOR ACTIVE DEVICES

FIELD OF THE INVENTION

This invention relates to active systems. Specifically, the invention relates to the area of active devices for placement between members which undergo relative vibration.

BACKGROUND OF THE INVENTION

Isolation and mounting systems are well known in the art, including passive, fluid, and active systems. Passive systems utilize passive isolating devices such as mountings and spring and shock absorber arrangements to isolate a suspended member from shock and vibrational inputs. The commonly assigned U.S. Pat. No. 5,116,030 to Nowak and Tillman entitled "Vibration Isolator", which is hereby incorporated by reference herein, is an example of a passive mount. Although these systems provide good isolation, they cannot provide highly nonlinear characteristics which vary as a function of time, which would greatly improve vibration isolation.

The commonly assigned U.S. Pat. No. 4,811,919 to Jones, U.S. Pat. No. 5,197,692 to Jones et al., and U.S. Pat. No. 5,127,607 to McGuire, which are all hereby incorporated by reference herein, describe fluid mountings and fluid systems for improving vibration isolation over and above the isolation capable by passive systems. In particular, the Jones '919 mounting describes a volume compensated fluid mount. This mounting utilizes tuned fluid inertial forces to provide a tuned resonant frequency and non-linear mount characteristics. Although these fluid mountings and systems provide improved isolation as compared to passive systems, they still provide inadequate isolation for some applications because the fluid tunability has only a limited tuning range and the stiffness cannot be zero at the tuned frequency.

For optimum isolation, active forces need to be developed which are added to, or subtracted from, the input disturbances in the proper phase relationship to minimize transmitted vibration irregardless of the frequency of the disturbance. Commonly assigned U.S. Pat. No. 5,174,552 to Hodgson et al., which is hereby incorporated by reference herein, is an example of such an active system. Although this system provides superior isolation, it utilizes fluid as the active actuator medium, which may not be required or desired in some applications.

U.S. Pat. No. 4,624,435 to Freudenberg, which is hereby incorporated by reference herein, describes a dry system including a resilient vibration isolator and an electromagnetically controllable vibration damping arrangement. U.S. Pat. No. 5,219,037 to Smith also includes an electromagnetic actuator including a first elastomer section and a second elastomer section. The first section is stiff radially and soft axially for protecting the actuator from side loads. The second elastomer section accommodates shear motions in the mounting. In Smith, an elastomer is shown placed in series-spring relationship with the actuator, however no mention is made of the characteristics of the elastomer. Furthermore, these voice coil systems are typically used for higher amplitude and relatively low force applications. This is because voice coil actuators do not function adequately at low amplitudes. Because of limited force output (a few pounds), mountings utilizing piezoelectric actuators have been developed.

U.S. Pat. No. 5,154,403 to Sato, which is hereby incorporated by reference herein, describes a elastomeric bushing type mount which includes annular piezoelectric elements 30, 30a. These elements are controlled via a schedule or control algorithm to generate vibrations which tend to negate the vibrations which are transmitted from a power unit. Although this method does improve vibration isolation to some extent, the system is not fail safe because there is no redundant load path. Furthermore, the negating vibrations are themselves highly attenuated because they act through the elastomer body 16 rather than directly between the two relatively moving members. Therefore, the mounting is not very effective because the actuator must act through the elastomer rather than directly between the two moving members.

U.S. Pat. No. 5,052,529 to Sutcliffe et al. which is hereby incorporated by reference herein, describes a system for active control of vibration including an elastomer section 18 and a series of magnetostrictive actuators 22, 24, 26. Again, the actuation potential of the actuators is substantially attenuated because of the arrangement of elastomer section 18. Furthermore, the system is not fail safe. Therefore, although these piezoelectric and magnetostrictive systems do perform better than the abovementioned voice-coil type systems in low amplitude applications, these systems do not perform adequately for many higher frequency applications. This is because they are acting through an attenuating member such as elastomer 18 in the '529 device and elastomer 16 in the '403 device.

SUMMARY OF THE INVENTION

Therefore, in light of the advantages and drawbacks of the related art, the present invention is a frequency-dependent decoupler for use in an in-series spring relationship with an active device such as an actuator so the device is decoupled at low frequencies and coupled at higher frequencies. The invention includes a decoupler that is arranged in an in-series-spring relationship to an active device and in an in-parallel-spring relationship to a primary spring, and which is more frequency sensitive than the primary spring. The primary spring provides a primary, static-load-support path for fail safe features.

Because the decoupler is more frequency sensitive than the primary spring, low frequency motions are decoupled to some extent. This means that motion across the decoupler is allowed at lower frequencies, thus minimizing loads imparted to the actuator. However, at high frequency it is a different story: the decoupler is much stiffer, by as much as 30 times or more, such that when the actuator is actuated, large forces are transmitted across the mount and it is much more effective. In some embodiments this can provide an essentially rigid connection between the two moving members at the higher frequencies. This invention is useful in that it makes the actuator extremely effective for high frequency vibration attenuation. Because the actuator is coupled at high frequency, the system functions as though the actuator were directly connected between the two moving members.

The present invention is an active device comprising a spring connected between an inner member and an outer member for providing a resilient connection, an actuator arranged in parallel spring relation to the primary spring, a decoupler directly connected to and arranged in series spring relationship to said actuator for providing a frequency dependency factor which is greater than a frequency dependency factor of said spring.

It is therefore an advantage of the present invention that the actuator is more effective at high frequencies because the actuator is coupled to the relatively moving members.

It is also an advantage of the present invention that the actuator is decoupled at low frequencies such that the relatively moving members are at least somewhat unimpeded for transitory low frequency and static inputs.

The abovementioned and further features and advantages of the present invention will become apparent from the accompanying descriptions of the preferred embodiments and attached drawings.

BRIEF DESCRIPTION OF THE DRAWINGS

The accompanying drawings which form a part of the specification, illustrate several embodiments of the present invention. The drawings and description together, serve to fully explain the invention. In the drawings.

DETAILED DESCRIPTION OF THE INVENTION

Figure 1:
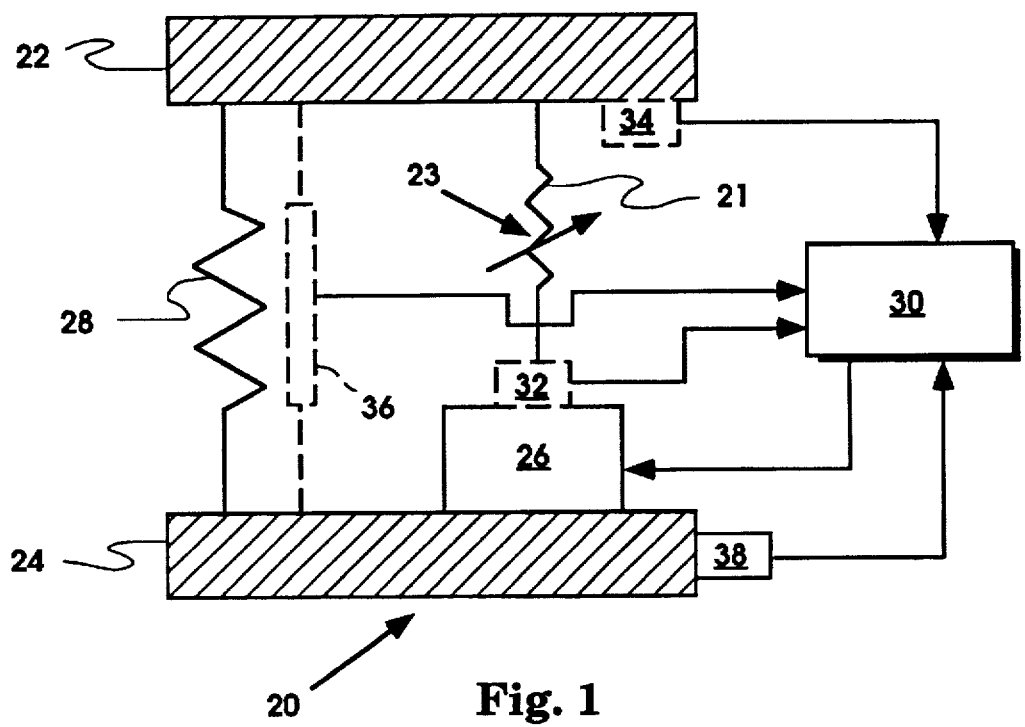
FIG. 1 is a block diagram illustrating an active system utilizing a frequency-dependent decoupler.

The block diagram of FIG. 1 illustrates a system 20 which is useful for controlling the transmission of vibrational energy between two members. The system 20 includes an actuator assembly 23 including the decoupler 21 and an actuator 26. The actuator assembly 23 is connected between, and interconnected to, a first member 22 and a second member 24 which undergo relative vibratory motion, such as sinusoidal or random vibration. Also attached to, and connected between, the members 22 and 24, is a spring 28 which provides a resilient connection between members 22 and 24 and carries static loads. The spring 28 also provides a parallel load path for fail-safe features. Furthermore, the spring 28 is in parallel-spring relationship to the actuator assembly 23. The actuator 26 and decoupler 21 are arranged in series-spring relationship. The decoupler 21 is frequency dependent (as indicated by the arrow) and can stiffen by a factor of about thirty or more, depending on the type of decoupler 21 used.

Notably, the decoupler 21 can be a passive element in that it does not require power, although some of the embodiments may need power, such as the glass-transition decoupler to be described later. These decoupler concepts could be utilized with a variety of controllable devices that operate at high frequency, yet have to accommodate large low frequency motions and load variations.

The actuator 26 provides the phased forces for vibration reduction or cancellation and is controllable via a controller 30. Controller 30 which is electronic provides a signal to the actuator 26 responsive to at least one sensor which provides a signal indicative of a system condition and from which the system condition can be derived. The system 20 is controlled according to a predetermined algorithm. All types of controllers and control methods may be utilized with this invention. A number of types of sensors could be used to provide a signal indicative of the system condition. At least one sensor is required to provide the signal. Sensor 32 is a force sensor, sensor 34 is an acceleration sensor, sensor 36 is a linear variable displacement transducer (LVDT) or linear velocity transducer (LVT), and sensor 38 is also an acceleration sensor, like sensor 34.

It is preferable that the sensor be included on the member which is sought to be isolated, such as member 24 including sensor 38. Only one sensor is required, although the other sensors are useful for providing more refined control of the system 20.

Figure 2:
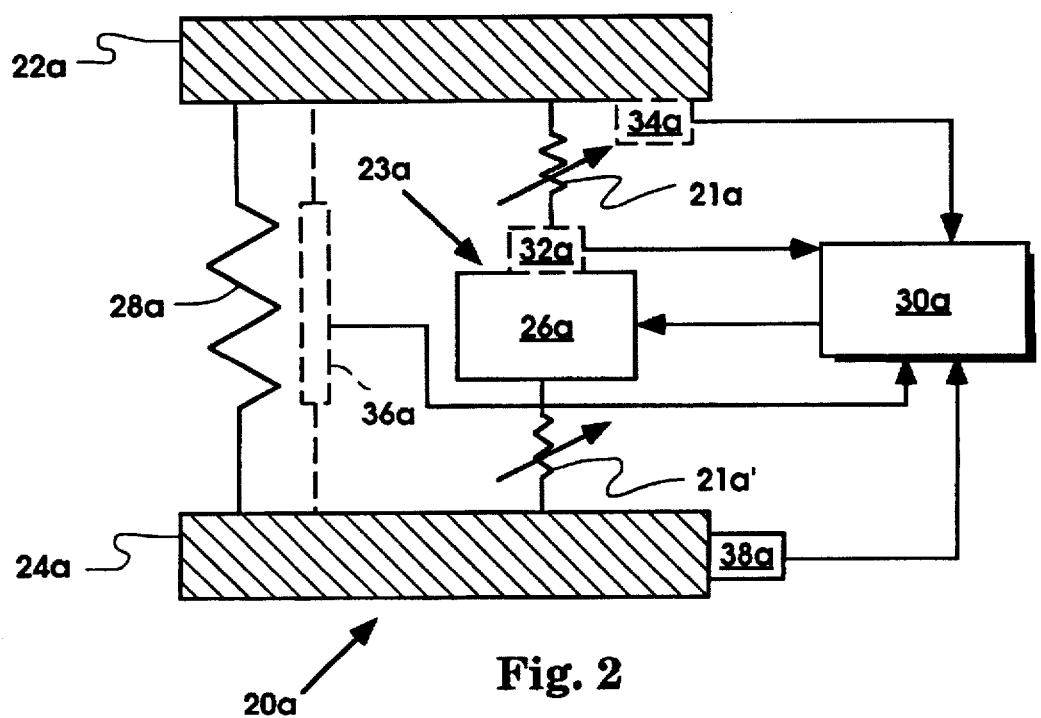
FIG. 2 is a block diagram illustrating an active system utilizing a plurality of frequency-dependent decouplers.

In the following descriptions, like numerals denote like elements as compared to FIG. 1. FIG. 2 illustrates a system 20a including actuator assembly 23a including a first decoupler 21a and a second decoupler 21a' preferably installed and attached adjacent either end of actuator 26a. The reason for including two decouplers 21a and 21b is to further minimize side loads acting on the actuator 26a when compared to using just one decoupler. For low amplitude systems, it is desirable to use piezoelectric or electrostrictive elements as the actuators. U.S. Pat. No. 4,978,881 to Wakita et al. and U.S. Pat. No. 4,937,489 to Hattori et al. teach stacked piezoelectric actuators, both the specifications of which are hereby incorporated by reference herein.

Figure 3:
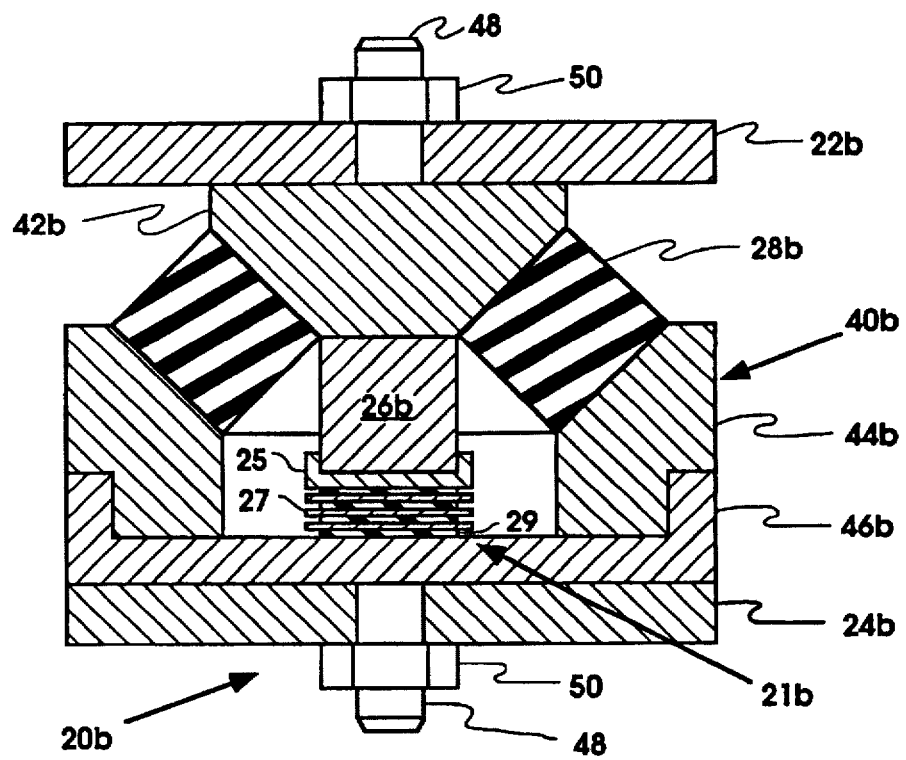
FIG. 3 is a passive frequency-dependent decoupler within an active mounting.

FIG. 3 illustrates an elastomeric decoupler 21b placed in an in-series spring relationship between an actuator 26b and the housing 40b of active mount 20b. Alternatively, the decoupler 21b could be placed between the inner member 42b and the actuator 26b. The mount 20b is used for providing a resilient connection between relatively movable members 22b and 24b. These members 22b and 24b may include a vehicle engine and frame, an engine and support, or any supporting member and supported member, or the like.

The housing 40b preferably includes a sleeve 44b of annular shape and a bottom 46b attached and secured thereto by crimping, bolting, welding, or the like. This attachment allows insertion of the actuator 26b and decoupler 21b inside the mount 20b. Preferably, a preload is placed on the actuator 26b which is preferably of the piezoelectric or magnetostrictive type. The actuator 26b is rigidly connected to the inner member 42b by means not shown such as gluing or bolting. Furthermore, decoupler 21b is integrally bonded, and thus forming a chemical bond, to plate 46b by bonding means known to those skilled in the art. The decoupler 21b preferably is attached to the actuator 26b by cold bonding or through physical attachment and connection through an intermediate member 25. The decoupler 21b preferably includes shim 27 and elastomer 29 and is of construction known as the laminated-shim-and-elastomer type. Studs 48 and nuts 50 attach the mount to the members 22b and 24b.

The spring 28b is preferably annular (frustoconical) in shape and is manufactured from an elastomer material. The spring 28b is bonded to the inner member 42b and also to the housing 40b by bonding processes known to those of ordinary skill in the art. Typical materials used for manufacture of the spring 28b include natural rubber (NR), natural (NR) and polybutadiene (BR) blends, Silicone (VMQ), or the like having a shear modulus in the range of about 50 to 350 pounds per square inch (psi) and exhibiting a tan delta or loss factor of about 0.15 or less. However, coil, belleville, and other metal springs could be envisioned for use as the primary spring as long as they exhibit low-frequency sensitivity and low damping.

The decoupler 21b preferably is also manufactured from an elastomeric material. However, the point of novelty is that the decoupler 21b exhibits a frequency dependency factor which is greater than that of the spring 28b. In this fashion, the decoupler 21b is softer at low frequencies and is considerably stiffer at high frequencies. A typical decoupler 21b might have a frequency dependency factor between 5 Hz and 100 Hz in the range of about 1.2 to 1.5 or more. In other words, the material is 1.2 or more times stiffer at 100 Hz than at 5 Hz. The spring 28b would have a frequency dependency factor which is 1.1, or less. Effectively, this high frequency dependency factor, makes the actuator 26b become more effective at high frequency while allowing the actuator to be decoupled, to some extent, at low frequencies, because the decoupler 21b is softer at low frequencies. The preferred material for the decoupler 21b is a copolymer of ethylene and acrylate (AEM), butyl (IIR), or nitrile (NBR) which exhibits a shear modulus in the range between about 50 and 350 psi and a tan delta (loss factor) of approximately 0.3 or higher. Typically, low frequency is considered below 20 Hz and high frequency is anything above 20 Hz. Most practical applications will take in ranges having excitation between about 1 Hz and 250 Hz.

Figure 4:
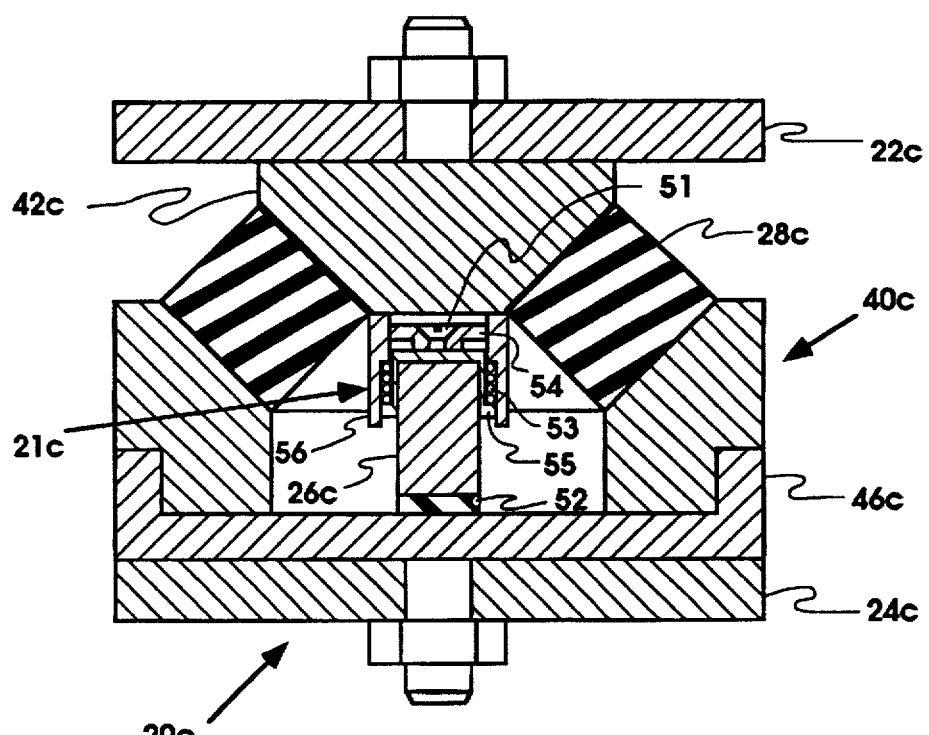
FIG. 4 is a friction-type frequency-dependent decoupler within an active mounting.

FIG. 4 illustrates an embodiment of mounting 20c which includes a friction decoupler 21c. The arrangement is similar to FIG. 3 except the decoupler 21c obtains its frequency dependency factor from a friction element. Again, the spring 28C is preferably a low-damped material which exhibits a frequency dependency factor of about 1.1 or less between about 5 and 100 Hz. The friction decoupler 21c interconnects and attaches between the inner member 42c and the actuator 26c. A second decoupler 52 of the type taught in the FIG. 3 embodiment is preferably included to decouple the actuator 26c from side loads.

The friction decoupler 21c is comprised of a rubbing member 54 and a rubbed member 56. As shown here, the rubbing member 54 is a friction member and is at least partially split, preferably into four pie-shaped sections, and is manufactured from a brake-pad like material. Any material which has a high coefficient of friction and good wear properties is acceptable. The rubbed member 56 is a metal sleeve of cylindrical-like construction and is attached to the inner member 42c. The rubbing member 54 is slidably received within the rubbed member 56. In this embodiment, the cap 55 rigidly attaches to the actuator 26c by bolting, gluing or the like.

The rubbing member 54 attaches to the cap 55 via screw 51. Spring maintains spring loading between the rubbed member 56 and the cap This serves to maintain a preload on actuator 26c. The split sections of the rubbing member 54 are urged against the taper on screw 51 and resultantly maintains a constant pressure of the split sections of rubbing member 54 against the wall of sleeve 58 by forcing each section in an outward radial direction. The friction decoupler 21c can be adjusted by varying the compression via screw 51. The friction decoupler 21c is highly frequency dependent and exhibits a frequency dependency factor between 5 hertz (Hz) and 100 hertz (Hz) of about 9. Alternatively, friction elements of the surface-effect type could be used as is taught in the commonly assigned U.S. Pat. Nos. 4,957,279 and 4,964,516 to Thorn, which are hereby incorporated by reference herein.

Figure 5:
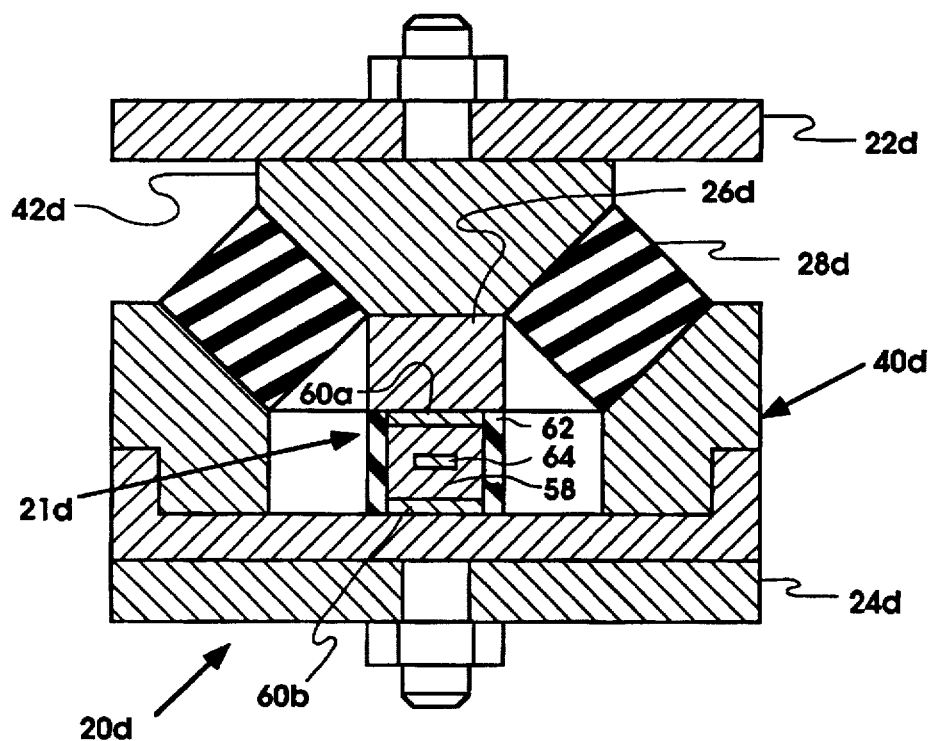
FIG. 5 is a frequency-dependent, glass-transition decoupler in an active mounting.

FIG. 5 illustrates a decoupler 21d of the glass-transition type included within an active mounting 20d. This embodiment is essentially identical to FIG. 3 embodiment except that the decoupler 21d is of the glass-transition type. Such a decoupler 21d exhibits its frequency dependency factor by taking advantage of the material characteristics of the materials used in the decoupler 21d around the glass-transition point of the materials. The decoupler 21d includes a core 58, end elements 60a and 60b, a heating element 64, and an insulation 62 surrounding the core 58. The decoupler 21d is believed to operate by the following principle. The core 58 is heated by heating element 64 and thus core 58 to a point just above the glass-transition point of the core material. In this state, the material is pliable and exhibits a low stiffness. At low frequency, the material essentially acts as a low-stiffness spring, and thus, the actuator 26d is decoupled and motion is allowed across the material and the decoupler 21d. At high frequency, the material begins to stiffen when maintained at constant temperature. This frequency dependence is inherent in the material and is thought to be a molecular phenomena. The present invention exploits the condition to substantially couple the actuator 26d at higher frequencies (approx. 20 Hz and higher).

The preferable material for the core 58 is a mixture of EPON 825 and JEFFAMINE D-400 epoxies, which are available from DuPont, mixed in a ratio of approximately 1 to 1. The heating element 62 is thermistor of the positive thermal coefficient (PTC) type. The power draw on these types of devices is two watts or less. The insulation 62 is any elastomer material such as nitrile, natural rubber, or the like which can insulate the core material and prevent heat loss. The end elements are preferably untilled epoxy exhibiting a low thermal conductivity. This decoupler 21d may exhibit a frequency dependency factor of about 4 or higher. Notably, if the mounting is in a suitable constant temperature environment, the heating element would not be necessary.

Figure 6:
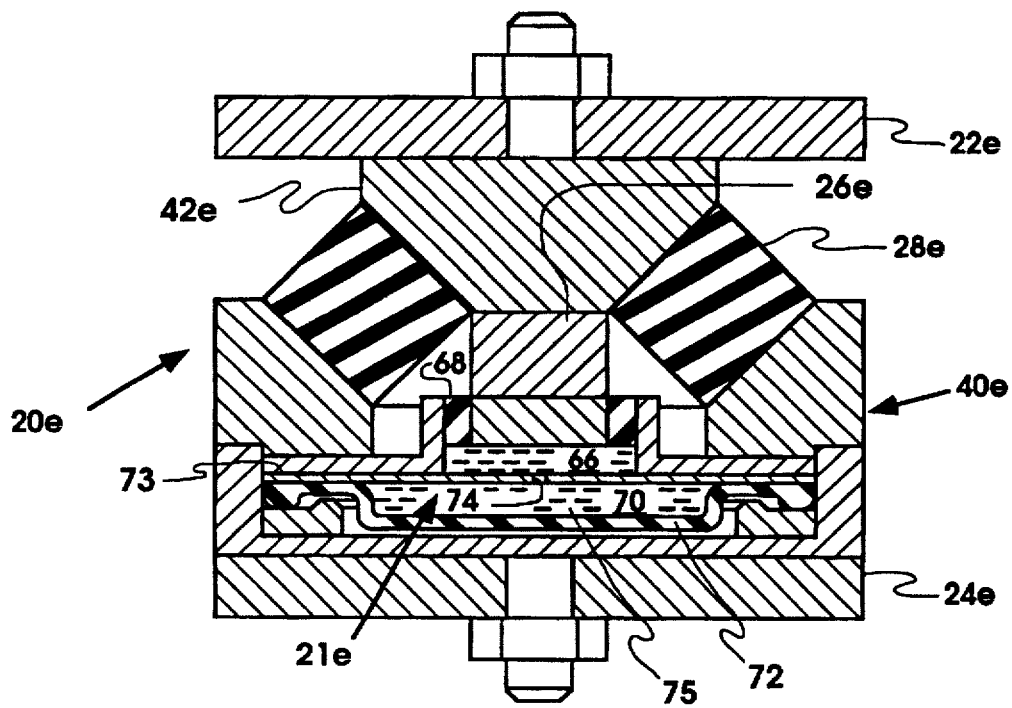
FIG. 6 is a frequency-dependent, fluid decoupler within an active mounting.

FIG. 6 illustrates a fluid embodiment of decoupler 21e in the environment of mount 20e. This decoupler 21e is fully enclosed and is a separate fluid device which is placed in an in-series spring relationship with the actuator 26e. Keeping the decoupler 21e separate allows the decoupler 21e to be precisely tuned to provide optimum decoupling. Furthermore, this decoupler 21e provides a secondary load path for fail safety. Preferably, the actuator 26e is placed between the inner member 42e and the decoupler 21e. The decoupler 21e of the fluid type exhibits low stiffness at low frequency yet, at high frequencies, the device can be extremely stiff. Decouplers 21e of the fluid type may increase in stiffness by a factor of thirty or more in less than one decade of frequency. Therefore, the fluid-type decouplers 21e are preferred for the most demanding applications.

The decoupler 21e includes a first fluid chamber 66 which is partially defined by a first flexible member 68, and a second fluid chamber 70 at least partially defined by a second flexible member 72. A plate 73 divides the chambers 66 and 70 and includes a passage 74 formed in it. At low frequencies, a fluid 75 which is contained within, and substantially fills, the chambers 66 and 70 and passage 74 is free to pass through passage 74. However at high frequency, the fluid 75 will hydrodynamically lock such that little if any fluid 75 flow will take place through the passage 74. By proper sizing of the fluid chambers 66 and 70, selection of the volume stiffnesses of first and second flexible members 68 and 72, and proper sizing of the passage 74, the device can be tuned to provide a substantial frequency dependency factor at a point as low as 2 Hz.

Figure 10:
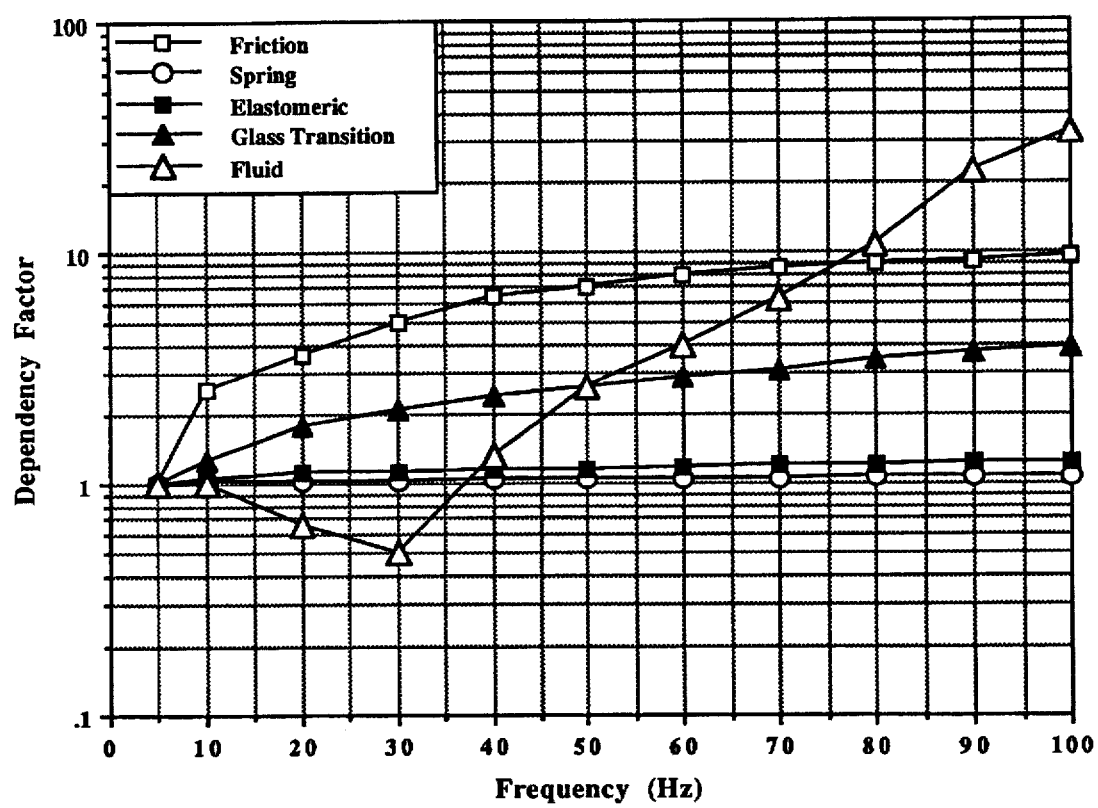
FIG. 10 is a performance plot of the frequency-dependent decouplers.

By way of example and not by limitation, a fluid decoupler 21e may include a first flexible member 68 which may be a metal diaphragm, a fabric reinforced diaphragm, or a bellows which exhibits an approximate top volume stiffness $K_{v\ top}$=200,000 (psi/in$^5$) pounds per square inch per inch to the fifth power, a second flexible member 72 exhibiting an approximate bottom volume stiffness of $K_{v\ bot}$=500 (psi/in$^5$) pounds per square inch per inch to the fifth power, a first fluid chamber including an approximate piston area of $A_p$=1.0 (in$^2$) square inches, a passage 74 with an approximate diameter of D=0.05 (in) inch, and a fluid 75 exhibiting an approximate fluid viscosity of 10 (cs) centistokes. The preferred static axial stiffness would be Ka=2000 (lb/in) pounds per inch or less. A representative frequency dependency factor of this type of decoupler 21e is illustrated in FIG. 10.

Figure 7:
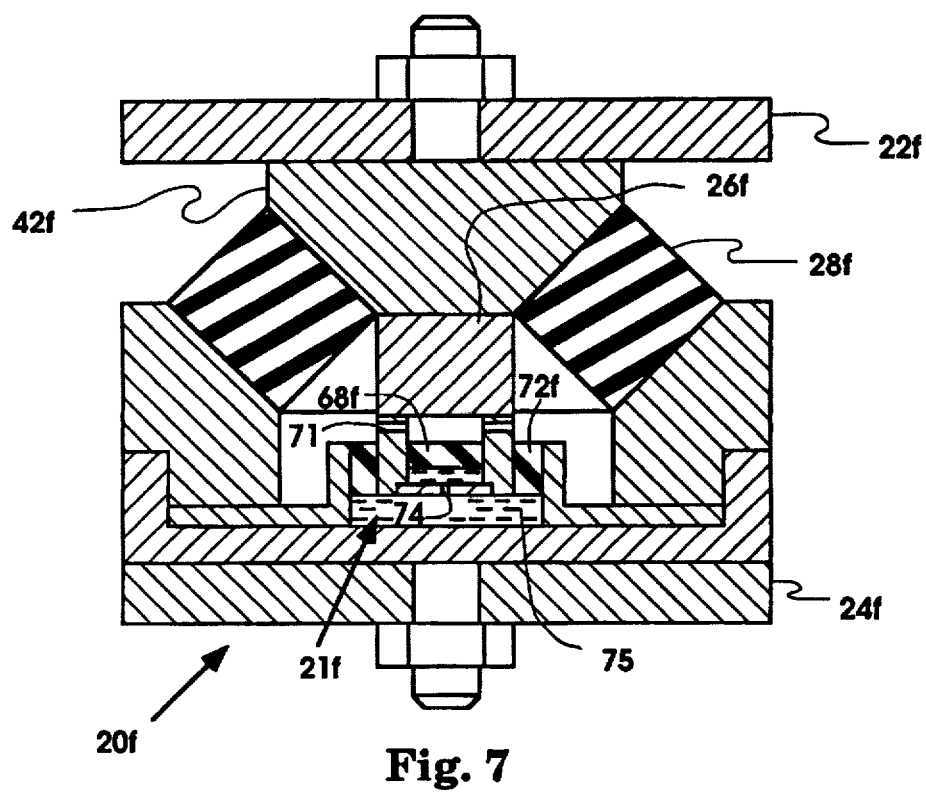
FIG. 7 is a another embodiment of frequency-dependent, fluid decoupler in an active mounting.
Figure 8:
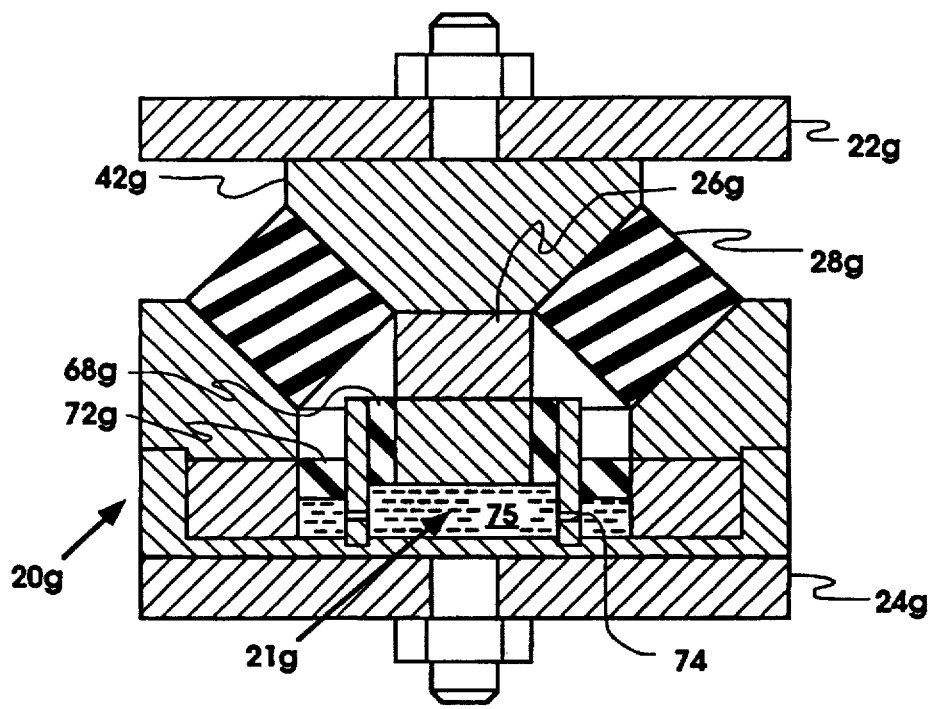
FIG. 8 is a another embodiment of frequency-dependent, fluid decoupler in an active mounting.

FIGS. 7 and 8 illustrate two other embodiments of fluid-type decouplers 21f and 21g. They are functionally similar to the FIG. 6 embodiment except that the first and second flexible members 68f, 68g and 72f, 72g are not flexible diaphragms, but are bonded elastomer sections. In both embodiments the fluid 75 passes through a passage 74 or even multiple passages if desired. In FIG. 7, passage 71 is provided to eliminate pressure buildup above flexible member 68f. This embodiment illustrates how small the decoupler 21f can be made in practice.

Figure 9:
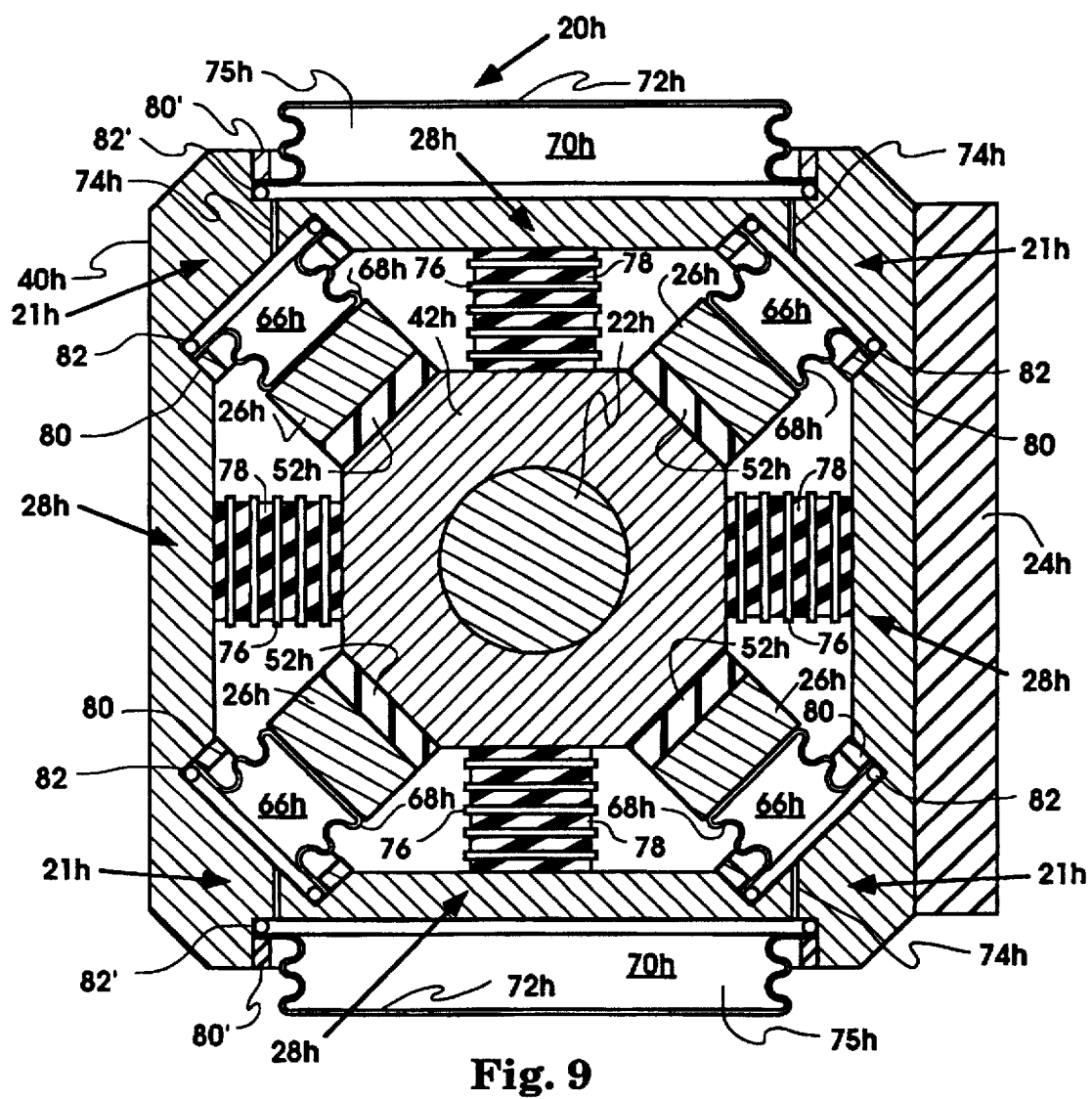
FIG. 9 is a another embodiment of active mounting including multiple frequency-dependent, fluid decouplers and multiple actuators.

FIG. 9 illustrates another embodiment of fluid-type decoupler 21h illustrated in the environment of a mount 20h. The mounting 20h includes a plurality of springs 28h which are manufactured from laminated shims 76 and elastomer sections 78 which are arranged between the inner member 42h and the housing 40h. These shims 76 are preferably metal and multiple elastomer sections 78 are preferably low-damped elastomer such as natural rubber, polybutadiene/natural blend, or the like. These springs 28h preferably have a spring rate of approximately 50,000 (lb/in) pounds per inch along their stiffest axis (perpendicular to plane of shim) and approximately 1000 (lb/in) pounds per inch along their shear axis (parallel to plane of shim). The first and second flexible members 68h and 72h are flexible metal bellows, or the like. These bellows at least partially define the first and second fluid chambers 66h and 70h and exhibit a very high volume stiffness, i.e., they are essentially rigid in bulge. The flexible members 68h and 72h are held in place by inserts 80 and 80' and sealed by seals 82 and 82'. Inserts 80 and 80' are received in recesses in housing 40h and are retained by a press fit or threading. Decoupling elastomer sections 52h which are as described in the FIG. 3 embodiment decouple the actuators 26h from side loads. Of course, only two actuator elements would be required for two axis actuation.

In function, the inner member 42h is attached to first member 22h, such as the pilot shown. The housing 40h is attached to the second moving member 24h. Actuation of actuator 21h, each of which can be separately actuated along its axis, can through proper phasing of the actuator forces substantially reduce the transmitted vibration. Decouplers 21b substantially decouple the actuator 26h at low frequency, such that large transitory motions of the inner member 42h relative to the housing 40h are allowed. However, at high frequency, above about 20 Hz, the passage 74h hydrodynamically locks up and little, if any, fluid 75h flows through the passages 74h. Because the volume stiffness of the flexible member 68h is so high, the actuator 26h is substantially rigidly coupled to the housing 40h along its axis. This enhances the actuator's 26h effectiveness by proving a more rigid connection between the inner member 42h and the housing 40h. Alternate embodiments can be envisioned without the elastomer decouplers 52h where the actuator 26h is rigidly coupled to the inner member 42h.

FIG. 10 illustrates the performance characteristics of the various types of decouplers that were described above. Item 84 illustrates the typical frequency response of the load carrying spring 28 (FIG. 1). The elastomers used for the primary spring 28 (FIG. 1) are low damped and exhibit low frequency sensitivity or dependence. Item 86 illustrates a typical elastomeric frequency decoupler 21b (FIG. 3). The material is more frequency sensitive as compared to the primary spring 28b (FIG. 3). Item 87 illustrates the performance characteristics of a glass-transition decoupler 21d (FIG. 5). Item 88 illustrates the performance characteristics of a friction decoupler 21c (FIG. 4). Item 90 illustrates the representative performance characteristics of a fluid-type decoupler such as decouplers 21e, 21f, 21g (FIG. 6, 7, and 8).

While several embodiments of the present invention have been described in detail, various modifications, alterations, changes and adaptations to the aforementioned may be made without departing from the spirit and scope of the present invention defined in the appended claims. It is intended that all such modifications, alterations, changes and adaptations be considered part of the present invention.

What is claimed is:

1. A system for controlling the transmission of vibrational energy between a first member and a second member which members undergo relative vibratory motion, comprising:

a) a spring attached between said first member and to said second member for providing a primary static load support path;

b) an actuator arranged in parallel-spring relation to said spring and having a first and a second end, said first end being directly attached to a first one of said first and said second members;

c) at least one sensor associated with said system for producing a signal from which a system condition is derived;

d) a controller for controlling said actuator responsive said signal; and e) a separate decoupler arranged in series-spring relationship to said actuator for decoupling said actuator at low frequencies and coupling said actuator at high frequencies, said separate decoupler being directly attached between a second one of said first and said second members and said second end of said actuator and separate from said spring such that characteristics of said decoupler may be changed separately from said spring.

2. The system of claim 1 wherein said spring is a low-damped elastomer selected from the group consisting of natural rubber, natural rubber and polybutadiene blends, and silicone.

3. The system of claim 1 wherein said actuator is piezoelectric.

4. The system of claim 1 wherein said separate decoupler is elastomeric and which exhibits a frequency dependency factor of between 1.2 and 1.5.

5. The system of claim 1 wherein said separate decoupler includes a friction element for providing a frequency dependency factor which is greater than a frequency dependency factor of said spring.

6. The system of claim 1 wherein said separate decoupler includes a glass-transition element for providing a frequency dependency factor by maintaining a temperature of said glass-transition element at a temperature above a glass-transition point of said glass-transition element such that when frequency is increased said separate decoupler exhibits a frequency dependency factor which is greater than a frequency dependency factor of said spring.

7. The system of claim 1 wherein said separate decoupler includes a first fluid chamber; a second fluid chamber; a fluid passage interconnecting said first and said second fluid chambers; and a fluid contained within, and substantially filling, said first fluid chamber, said second fluid chamber, and said fluid passage; such that when said actuator is activated, said fluid flows substantially unimpeded through said passage at low frequency, yet is substantially hydrodynamically locked at high frequency, such that substantially no fluid flows at high frequency for providing a frequency dependency factor which is greater than a frequency dependency factor of said spring.

8. An active device, comprising:
 a) a spring connected between an inner member and an outer member for providing a resilient connection and a primary load path;
 b) an actuator arranged in parallel-spring relation to said spring;
 c) a separate decoupler directly connected to, and arranged in series-spring relationship with said actuator, said separate decoupler being directly connected to one of said inner member and said outer member, said separated decoupler for providing a frequency dependency factor which is greater than a frequency factor of said spring, whereby said actuator in series-spring-relationship provides a second load hath parallel to said primary load path.

9. A device of claim 8 wherein said separate decoupler is an elastomeric element which exhibits a frequency dependency factor of at least 1.2 as compared to a frequency dependency factor of said spring which is less than or equal to 1.1.

10. A device of claim 8 wherein said separate decoupler includes a friction element for providing a frequency dependency factor which is greater than a frequency dependency factor of said spring.

11. A device of claim 8 wherein said separate decoupler includes a glass-transition element for providing frequency-stiffening characteristics by maintaining a temperature of said glass-transition element at a temperature above a glass-transition point of said glass-transition element such that said separate decoupler exhibits a frequency dependency factor which is greater than a frequency dependency factor of said spring.

12. A device of claim 8 wherein said separate decoupler includes a first fluid chamber; a second fluid chamber; a fluid passage interconnecting said first and said second fluid chambers; and a fluid contained within, and substantially filling, said first fluid chamber, said second fluid chamber, and said fluid passage; such that when said actuator is driven, said fluid flow exhibits frequency dependency for providing a frequency dependency factor which is greater than a frequency dependency factor of said spring.

13. A device of claim 8 further including additional springs having high-stiffness axes which are directed in different radial directions and arranged between said inner and said outer member, additional actuators which are actuatable in said different radial directions, and additional separate decouplers associated with each said additional actuator which further include a flexible element.

* * * * *